(12) United States Patent
Prentice et al.

(10) Patent No.: US 12,466,983 B2
(45) Date of Patent: Nov. 11, 2025

(54) DIELECTRIC THERMAL MANAGEMENT FLUIDS AND METHODS FOR USING THEM

(71) Applicant: BP P.L.C., London (GB)

(72) Inventors: Giles Michael Derek Prentice, Reading (GB); Kevin Richard West, Misddlesex (GB)

(73) Assignee: BP P.L.C., London (GB)

( * ) Notice: Subject to any disclaimer, the term of this patent is extended or adjusted under 35 U.S.C. 154(b) by 912 days.

(21) Appl. No.: 17/606,347

(22) PCT Filed: Apr. 17, 2020

(86) PCT No.: PCT/EP2020/060909
§ 371 (c)(1),
(2) Date: Oct. 25, 2021

(87) PCT Pub. No.: WO2020/216690
PCT Pub. Date: Oct. 29, 2020

(65) Prior Publication Data
US 2022/0228047 A1     Jul. 21, 2022

(30) Foreign Application Priority Data
Apr. 24, 2019 (GB) ................... 1905733

(51) Int. Cl.
*C09K 5/10* (2006.01)
*H01M 10/0525* (2010.01)
(Continued)

(52) U.S. Cl.
CPC .......... *C09K 5/10* (2013.01); *H01M 10/0525* (2013.01); *H01M 10/613* (2015.04);
(Continued)

(58) Field of Classification Search
CPC .. C09K 5/10; H01M 10/0525; H01M 10/613; H01M 10/625; H01M 10/6568;
(Continued)

(56) References Cited

U.S. PATENT DOCUMENTS

| | | |
|---|---|---|
| 5,424,519 A | 6/1995 | Salee |
| 5,814,595 A | 9/1998 | Flynn et al. |

(Continued)

FOREIGN PATENT DOCUMENTS

| | | |
|---|---|---|
| CN | 102946983 A | 2/2012 |
| CN | 203856565 U | 10/2014 |

(Continued)

OTHER PUBLICATIONS

Durasyn 162 Technical Data Sheet (Year: 2024).*
(Continued)

*Primary Examiner* — Andrew J. Oyer
(74) *Attorney, Agent, or Firm* — McDonnell Boehnen Hulbert & Berghoff LLP

(57) ABSTRACT

This disclosure relates generally to thermal management fluids. This disclosure relates more particularly to a dielectric thermal management fluid suitable for use managing heat in battery systems, methods of using such thermal management fluids, and systems including such thermal management systems.

17 Claims, 3 Drawing Sheets

(51) Int. Cl.
*H01M 10/613* (2014.01)
*H01M 10/625* (2014.01)
*H01M 10/6568* (2014.01)

(52) U.S. Cl.
CPC ..... *H01M 10/625* (2015.04); *H01M 10/6568* (2015.04); *H01M 2220/20* (2013.01)

(58) Field of Classification Search
CPC . H01M 2220/20; H01M 10/6567; F28D 1/04; F28D 2021/0029; F28D 2021/0043; F28D 2021/008
See application file for complete search history.

(56) References Cited

U.S. PATENT DOCUMENTS

| | | | |
|---|---|---|---|
| 6,515,031 | B2 | 2/2003 | Fefer |
| 8,790,809 | B2 | 7/2014 | Schaefer et al. |
| 9,541,135 | B2 | 1/2017 | Tsuna |
| 9,555,380 | B2 | 1/2017 | Dahms et al. |
| 10,128,550 | B2 | 11/2018 | Lebreux et al. |
| 10,217,979 | B2 | 2/2019 | Harris et al. |
| 2004/0110050 | A1* | 6/2004 | Abd Elhamid ... H01M 8/04029 429/512 |
| 2005/0167169 | A1 | 8/2005 | Gering et al. |
| 2006/0061497 | A1 | 3/2006 | Matsumura et al. |
| 2008/0011979 | A1 | 1/2008 | Davidson et al. |
| 2008/0272331 | A1 | 11/2008 | Mohapatra et al. |
| 2009/0176148 | A1 | 7/2009 | Jiang et al. |
| 2009/0242829 | A1 | 10/2009 | Davidson et al. |
| 2010/0071881 | A1 | 3/2010 | Murer et al. |
| 2010/0108936 | A1 | 5/2010 | Kaneko |
| 2011/0073282 | A1 | 3/2011 | Guelles et al. |
| 2011/0088418 | A1 | 4/2011 | Kontomaris et al. |
| 2012/0209838 | A1 | 8/2012 | Dean et al. |
| 2012/0263980 | A1 | 10/2012 | Soukhojak et al. |
| 2013/0037741 | A1 | 2/2013 | Bimbaum et al. |
| 2013/0104548 | A1 | 5/2013 | Kontomaris |
| 2013/0256586 | A1 | 10/2013 | Kramer et al. |
| 2013/0280564 | A1 | 10/2013 | Zheng et al. |
| 2013/0337341 | A1 | 12/2013 | Tikhonov et al. |
| 2014/0079978 | A1 | 3/2014 | Al-Hallaj et al. |
| 2014/0216688 | A1 | 8/2014 | Shelnutt et al. |
| 2016/0163412 | A1 | 6/2016 | Walker |
| 2016/0325598 | A1 | 11/2016 | Schumann et al. |
| 2016/0333241 | A1 | 11/2016 | Fukushima et al. |
| 2018/0363989 | A1 | 12/2018 | Elie et al. |
| 2019/0120569 | A1 | 4/2019 | Dolderer et al. |
| 2021/0057793 | A1 | 2/2021 | Antonius et al. |

FOREIGN PATENT DOCUMENTS

| | | |
|---|---|---|
| CN | 106785222 A | 5/2017 |
| CN | 105622959 B | 8/2018 |
| EP | 3367495 A1 | 8/2018 |
| JP | H02246255 A | 10/1990 |
| JP | H11154265 A | 6/1999 |
| JP | 2003-533844 A | 11/2003 |
| JP | 2006083276 A | 3/2006 |
| JP | 2008115266 A | 5/2008 |
| JP | 2010132792 A | 6/2010 |
| JP | 2012184360 A | 9/2012 |
| JP | 2012197326 A | 10/2012 |
| JP | 2013522482 A | 6/2013 |
| JP | 2013249326 A | 12/2013 |
| JP | 2014509436 A | 4/2014 |
| JP | 2015-021117 A | 2/2015 |
| JP | 2016095960 A | 5/2016 |
| JP | 2016-188349 A | 11/2016 |
| JP | 2018126017 A | 8/2018 |
| JP | H 9-503801 A | 2/2022 |
| KR | 10-2012-0007493 A | 1/2012 |
| WO | 2001065626 A2 | 9/2001 |
| WO | 2005007771 A1 | 1/2005 |
| WO | 2011112311 A1 | 9/2011 |
| WO | 2013077379 A1 | 5/2013 |
| WO | 2016150925 A1 | 9/2016 |
| WO | 2018007611 A1 | 1/2018 |

OTHER PUBLICATIONS

Durasyn 164 Technical Data Sheet (Year: 2024).*
Chen et al. Comparison of different cooling methods for lithium ion battery cells. Applied Thermal Engineering, 2016, vol. 94, pp. 846-854.
Sharma et al. Review on thermal energy storage with phase change materials and applications. Renewable and Sustainable Energy Reviews, 2009, vol. 13 No. 2, pp. 318-345.
International Search Report and Written Opinion of the International Searching Authority for International Application No. PCT/EP2019/050260, mailed on Feb. 28, 2019.
European Search Report and Opinion for European Application No. 18150501, mailed on May 18, 2018.
International Search Report and Written Opinion of the International Searching Authority for International Application No. PCT/EP2020/060909, completed Jul. 8, 2020.
Search Report for Great Britain Application No. 1905733.0, completed Oct. 31, 2019.
Zhoujian et al. "A review on lithium-ion power battery thermal management technologies and thermal safety", Journal of Thermal Science, 2017, 26(5), p. 391-412.
James-Smith et al. "A novel method to quantify the amount of surfactant at the oil/water interface and to determine total interfacial area of emulsions." Journal of Colloid and Interface Science, 2007, 310(2), p. 590-598.
International Search Report and Written Opinion of International Application No. PCT/EP2019/067921, mailed Oct. 9, 2019. 14 pages.
International Search Report and Written Opinion of International Application No. PCT/EP2019/067922, mailed Oct. 15, 2019. 11 pages.
Search Report of GB Application No. 1811002.3, mailed Mar. 1, 2019. 4 pages.
Search Report of GB Application No. 1811003.1, mailed Mar. 1, 2019. 5 pages.
3M Thermal Management Fluids. "Safe Sustainable Cooling Performance: Dielectric heat transfer solutions for the electronics industry." Apr. 2009, 8 pages.
3M Two-Phase Immersion Cooling "3M Two-Phase Immersion Cooling—High Level Best Practices for System Fabrication" Nov. 2014, 4 pages.
DryTech "ZEOZORB Series Transformer Breather for Power Transformers." Nov. 2014, 1 page.
Hillard HILCO Division "HILCO Filter Cartridges: Revolutionizing the Filtration Industry." Nov. 6, 2012, 12 pages.
Castrol, "Perfecto™ TR UN, Product Data." Jul. 5, 2019, 2 pages.

* cited by examiner

DIELECTRIC THERMAL MANAGEMENT FLUIDS AND METHODS FOR USING THEM

This application is a national stage application under 35 U.S.C. § 371 of International Application No. PCT/EP2020/060909, filed Apr. 17, 2020, which claims priority to Great Britain Patent Application No. 1905733.0, filed Apr. 24, 2019, the disclosures of which are explicitly incorporated by reference herein.

BACKGROUND OF THE DISCLOSURE

Field of the Disclosure

This disclosure relates generally to thermal management fluids. This disclosure relates more particularly to a dielectric thermal management fluid suitable for use managing heat in battery systems through direct cooling, such as lithium-ion batteries used in electric vehicles, electric motors, and power electronics, methods of using such thermal management fluids, and systems including such thermal management systems.

Technical Background

The number of electric vehicles (i.e., vehicles using electric power for all or a portion of their motive power such as battery electric vehicles (BEVs), hybrid electric vehicles (HEVs), plug-in hybrid electric vehicles (PHEVs), and the like) sold globally has increased over the last several years, and is expected to continue to increase. Ultimately, the vast majority of vehicles will likely be electric. As electric vehicle technology continues to evolve, there is a need to provide improved power sources (e.g., battery systems or modules). For example, it is desirable to increase the distance that such vehicles may travel without the need to recharge the batteries, to improve the performance of such batteries, and to reduce the costs and time associated with battery charging.

Currently, battery-powered electric vehicles almost exclusively use lithium-ion battery technology. Lithium-ion batteries offer many advantages over the comparable nickel-metal-hydride batteries, but as compared to nickel-metal-hydride batteries, lithium-ion batteries are more susceptible to variations in battery temperature and thus have more stringent thermal management requirements. For example, optimal lithium-ion battery operating temperatures are in the range of 10 and 35° C. Operation is increasingly inefficient as temperatures rise from 35 to 70° C., and, more critically, operation at these temperatures can damage the battery over time. Temperatures over 70° C. present increased risk of thermal runaway. As a result, lithium-ion batteries require systems to regulate their temperatures during vehicle operation. In addition, during charging, up to 10% of the inputted power ends up as heat. As the fast charging of lithium-ion batteries becomes more common, the need remains for efficient systems for thermal management of the batteries.

Lithium-ion batteries may be cooled directly or indirectly, using thermal management fluids to carry heat away from the battery component (i.e., as a cooling fluid or coolant). Direct cooling advantageously allows the thermal management fluid to come into direct contact with the hot components to carry heat away therefrom. In indirect cooling, a hot component is electrically shielded by an electrically-insulating barrier and the thermal management fluid carries away heat passing through this barrier. The most common thermal management fluids are based on mixtures of water with glycol. But because water-based fluids typically conduct electricity, they cannot be used in the direct cooling of electrical components of lithium-ion batteries. While indirect cooling allows for water-based coolants to be used, the requirement of electrical shielding can create a bottleneck for the cooling process. There exist dielectric thermal management fluids that can be used for direct cooling of electrical components due to their non-electrically-conductive nature; examples include those conventionally used in the cooling of electrical transformers. However, the thermal properties of such dielectric thermal management fluids are typically poor in comparison to water-glycol.

Thus, there remains a need for improved dielectric thermal management fluids, especially those suitable for use in the cooling of lithium-ion batteries.

SUMMARY OF THE DISCLOSURE

One aspect of the disclosure provides thermal management fluids that do not have a flash point of less than 120° C., measured in accordance with ASTM D93, and have a dielectric constant of at least 1.5 at 25° C. Such dielectric thermal management fluids include: a dielectric fluid comprising one or more dielectric substances, the dielectric fluid having a flash point less than 150° C. measured in accordance with ASTM D93 and having a dielectric constant of at least 1.5 at 25° C., the dielectric fluid being present in a total amount in the range of 75 wt % to 99.9 wt %; and one or more halocarbons each having a boiling point in the range of 60° C. to 200° C., present in a total amount in the range of 0.1 wt % to 20 wt %, and homogeneously dispersed in the dielectric thermal management fluid.

Another aspect of the disclosure provides a battery system. The battery system includes a housing; one or more electrochemical cells disposed in the housing; a fluid path extending in the housing and in substantial thermal communication with the one or more electrochemical cells; and a thermal management fluid of the disclosure as described herein disposed in the fluid path.

In another aspect, the disclosure provides an electric vehicle comprising the battery system of the disclosure as described herein.

In another aspect the disclosure provides a thermal management circuit including: a fluid path extending around and/or through a heat source; and a thermal management fluid of the disclosure, disposed in and configured to circulate in the fluid path and to absorb thermal energy produced by the heat source, wherein the fluid is disposed in the fluid path, the heat exchanger, the pump and the connecting duct.

Another aspect of the disclosure provides a method a method including contacting a thermal management fluid of the disclosure with a surface having a temperature of at least 25° C. (e.g., at least 30° C.), the surface being in substantial thermal communication with a heat source; and absorbing thermal energy in the thermal management fluid from the heat source through the surface.

BRIEF DESCRIPTION OF THE DRAWINGS

The accompanying drawings are included to provide a further understanding of the compositions and methods of the disclosure, and are incorporated in and constitute a part of this specification. The drawings are not necessarily to scale, and sizes of various elements may be distorted for clarity. The drawings illustrate one or more embodiment(s) of the disclosure and, together with the description, serve to explain the principles and operation of the disclosure.

DETAILED DESCRIPTION

Figure 1:
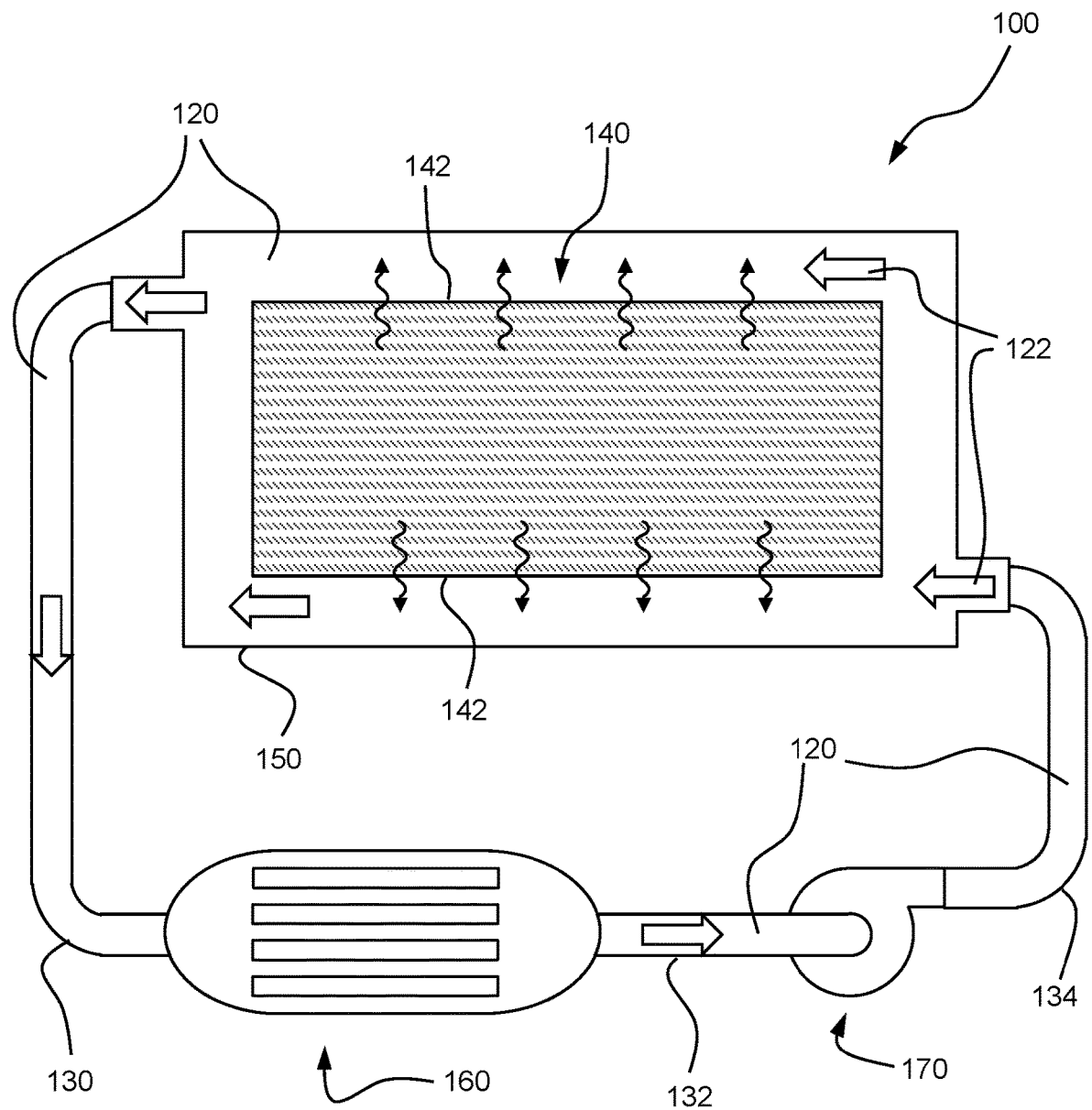
FIG. 1 is a schematic cross-sectional view of a thermal management circuit according to an embodiment of the disclosure.

The present inventors have noted that desirable thermal management fluids would in many cases have a high capacity to carry heat away in a temperature range relevant to operation of a particular electrical device or system (e.g., a lithium-ion battery), yet have a sufficiently high dielectric constant to be suitable for use in direct cooling of the device or system. Critically, because there is always a risk that oxygen might enter the overall system, desirable thermal management fluids would advantageously have a high or ideally no flash point, to reduce the risk of ignition. And to provide more efficient heat transfer during the operation, desirable thermal management fluids would advantageously have low viscosity allowing for better flowability in a particular electrical device or system.

The present inventors have identified thermal management fluid compositions that provide not only a desirably low viscosity but also lack a low flash point, so they can be easily pumped through a system but provide low-to-no risk of ignition. Specifically, the present inventors recognized that conventional dielectric fluids (e.g., organic or silicone) typically have good thermal conductivity and specific heat capacity. But typical low-viscosity dielectric fluids are based on low-molecular weight hydrocarbons, and generally have unacceptably low flash points (and other ignition properties) making them unsuitable for use as coolants in systems where there is the potential for temperatures to rise where ignition is a risk. The present inventors have determined that combination of a low-flash point dielectric fluid with a halocarbon can provide a thermal management fluid that does not have a low flash point. Many halocarbons have high flash points, or even no flash point at all. Thus, the present inventors have determined that vaporization of halocarbon can create a sufficiently high concentration of halocarbon vapor in the system to ameliorate the risk of ignition of the low-flash point dielectric fluid. The present inventors have determined that minor amounts (e.g., 20 wt % or less) of one or more suitable halocarbons can provide a thermal management fluid that does not have a low flash point. This allows for the use of a conventional dielectric fluid as the bulk of the thermal management fluid, and only minor amounts of the typically more expensive halocarbons. And the thermal management fluids described herein can have advantageously low viscosities. The presence of the halocarbon allows for a relatively low-viscosity base dielectric to be used with a substantially lowered risk of ignition, and many halocarbons are themselves low in viscosity. It is the combination of minor amount of halocarbon(s) with a dielectric fluid that results in the improved thermal management fluid of the disclosure, with the halocarbon component lowering the overall risk of ignition and in many cases providing a lowered viscosity. The dielectric fluid component can be selected to provide overall desirable heat flow and handling properties suitable, for example, for direct cooling of electrical devices and systems.

The thermal management fluids and methods of the disclosure can have a number of additional advantages over conventional fluids. Notably, the combination of materials in the thermal management fluid of the disclosure can also, in various embodiments, provide one or more of desirably high heat conductivity, low risk of ignition, high dielectric constant, and fast temperature response. The thermal management fluid of the disclosure can in certain embodiments also have lower surface tension and better elastomer compatibility than conventional low-viscosity dielectric fluids.

Thus, one aspect of the disclosure provides a thermal management fluid including: a dielectric fluid comprising one or more dielectric substances, the dielectric fluid having a flash point less than 150° C. measured in accordance with ASTM D93 and having a dielectric constant of at least 1.5 at 25° C., the dielectric fluid component being present in a total amount in the range of 75 wt % to 99.9 wt %; and one or more halocarbons each having a boiling point in the range of 60° C. to 200° C., present in a total amount in the range of 0.1 wt % to 20 wt %, and homogeneously dispersed in the dielectric thermal management fluid. The thermal management fluid of this aspect of the disclosure has a flash point of greater than 120° C., measured in accordance with ASTM D93, and a dielectric constant of at least 1.5 at 25° C.

As described above, the thermal management fluid of the disclosure includes a dielectric fluid. As used herein, a dielectric fluid is a liquid at 25° C. and has a dielectric constant of at least 1.5 at 25° C. Dielectric fluids especially desirable for use in the thermal management fluids described herein have relatively high thermal conductivity (e.g., at least 0.05 W/m·K, or at least 0.1 W/m·K, or even at least 0.12 W/m·K at 25° C.) and/or relatively high specific heat capacity (e.g., at least 1 J/g·K, or at least 1.2 J/g·K, or even at least 1.5 J/g·K at 25° C.).

As described above, the dielectric fluid component of the thermal management fluid has a flash point less than 150° C. measured in accordance with ASTM D93. The present inventors have advantageously determined that the use of a halocarbon can decrease the risk of ignition that is typically present when such low-flash point fluids are used. In certain embodiments of the thermal management fluids as otherwise described herein, the dielectric fluid has a flash point of no more than 140° C., e.g., no more than 120° C. or no more than 100° C. In other embodiments of the thermal management fluids as otherwise described herein, the dielectric fluid has a flash point of no more than 80° C., e.g., no more than 60° C., or even no more than 55° C. measured in accordance with ASTM D93.

The present inventors have advantageously determined that the combination of a dielectric fluid with a halocarbon as described herein can allow for the use of low-viscosity dielectric fluids with a reduced risk of ignition. Indeed, lower-viscosity fluids are often made of hydrocarbons with relatively lower molecular weight, which often translates to a lower flash point. Accordingly, in certain embodiments of the thermal management fluids as otherwise described herein, the dielectric fluid has a kinematic viscosity at 40° C. in the range of 2 to 20 cSt, e.g., in the range of 2 to 15 cSt, or 3 to 20 cSt, or 3 to 15 cSt, or 5 to 20 cSt, or 5 to 15 cSt. In certain embodiments of the thermal management fluids as otherwise described herein, the dielectric fluid has a kinematic viscosity at 40° C. in the range of 2 to 10 cSt, e.g., 2 to 8 cSt, or 2 to 6 cSt, or 3 to 10 cSt, or 3 to 8 cSt, or 3 to 6 cSt, or 5 to 10 cSt, or 5 to 8 cSt, or 5 to 6 cSt, or 6 to 10 cSt, or 8 to 10 cSt, as measured in accordance with ASTM D455. And In certain embodiments of the thermal management fluids as otherwise described herein, the dielectric fluid has a kinematic viscosity at 40° C. in the range of 2 to 5 cSt, or 2 to 4 cSt, or 2 to 3 cSt, or 3 to 5 cSt, or 3 to 4 cSt, or 4 to 5 cSt, as measured in accordance with ASTM D455.

The dielectric fluid of the disclosure includes one or more dielectric substances. Various dielectric substances are known in the art and can suitably be used in the compositions, systems and methods described herein. For example, in certain embodiments as otherwise described herein, the one or more dielectric substances may be selected from aliphatics (e.g., $C_{14}$-$C_{50}$ alkyls, $C_{14}$-$C_{50}$ alkenyls, $C_{14}$-$C_{50}$ alkynyls, polyolefins such as poly-α-olefin), aliphatic oxygenates (e.g., ketones, ethers, esters, or amides), aromatics (e.g., dialkylbenzene such as diethylbenzene, cyclohexylbenzene, 1-alkylnaphthalene, 2-alkylnaphthalene, dibenzyltoluene, and alkylated biphenyl), aromatic oxygenates (e.g., ketones, ethers, esters, or amides), silicones (e.g., silicone oil and silicate ester), and any combination thereof. The dielectric fluid can, in certain embodiments as otherwise described herein, be formed of at least 80 wt % of such substances, e.g., at least 85 wt % or even at least 90 wt % of such substances. In certain embodiments, each of the one or more dielectric substances is selected from $C_{14}$-$C_{50}$ alkyls, polyolefins, and any combination thereof.

In certain embodiments as otherwise described herein the dielectric fluid is an oil, e.g., a mineral oil, a synthetic oil, or a silicone oil. For example, in certain embodiments, the dielectric fluid is a low-viscosity Group II, III, IV, or V base oil as defined by the American Petroleum Institute (API Publication 1509). These are shown in Table 1.

TABLE 1

| Base Oil Stocks API Guidelines | | | |
|---|---|---|---|
| | Saturates | Sulfur content | Viscosity Index (VI) |
| Group I | <90 and/or | >300 ppm and | ≥80 and <120 |
| Group II | ≥90 and | ≤300 ppm and | ≥80 and <120 |
| Group III | ≥90 and | ≤300 ppm and | ≥120 |
| Group IV | Includes polyalphaolefins (PAO) and GTL (gas-to-liquid) products | | |
| Group V | All other base oils not included in Groups I, II, III or IV | | |

Group II and Group III base oils (such as hydrocracked and hydroprocessed base oils as well as synthetic oils such as hydrocarbon oils, polyalphaolefins, alkyl aromatics, and synthetic esters) and Group IV base oils (such as polyalphaolefins (PAO)) are wells known base oils. Oils suitable for use as transformer oils can, in many embodiments, be suitable for use as dielectric fluids in the compositions, systems and methods of the disclosure.

Commercially available dielectric fluids include Perfecto™ TR UN (available from Castrol Industrial, United Kingdom) and MIDEL 7131 (available from M&I Materials Ltd., United Kingdom). Examples of commercially available base oils include YUBASE 3 and YUBASE 4 (available from SK Lubricants Co. Ltd., South Korea), DURASYN® 162 and DURASYN® 164 (available from INEOS Oligomers, Houston, Texas), and PRIOLUBE™ oils (available from CRODA, United Kingdom).

In certain embodiments, the dielectric fluid is a Group II, Group III, Group IV, or Group V base oil. For example, in certain embodiments, the dielectric fluid is a Group II base oil. In certain other embodiments, the dielectric fluid is a Group IV base oil such as polyalphaolefins (PAO).

In certain embodiments as otherwise described herein, the dielectric fluid may be a diesel hydrocarbon formulated to a high flash point (e.g., more than 55° C., but less than 150° C. and in certain embodiments no more than the flash points described above) and optionally low sulfur content (e.g., less than 3000 ppm, less than 2000 ppm, less than 1000 ppm, or less than 300 ppm).

Based on the disclosure herein, the dielectric fluid can be selected to provide the thermal management fluids of the disclosure with a desirable overall heat capacity and thermal conductivity. Moreover, the one or more dielectric substances can be selected to have low reactivity with respect to the other components of the systems in which they are used and, when combined with suitable amounts of one or more halocarbons, to provide the thermal management fluid with a desired viscosity. Other considerations when selecting the dielectric fluid may include their dielectric constant, toxicity, environmental impact and cost.

Moreover, while the dielectric fluid is generally described herein in the singular, a plurality of oils or other dielectric fluids can be formulated together to provide the dielectric fluid component of the thermal management fluids of the disclosure.

The thermal management fluids of the disclosure can advantageously have a high proportion of the dielectric fluid, for example, such that it provides the bulk of the heat capacity and physical properties to the thermal management fluid. Use of a relatively inexpensive mineral or silicone oil-based dielectric fluid can also provide for low cost materials especially as compared to the cost of specialty halocarbon-based thermal management fluids. Accordingly, in this aspect of the disclosure, the dielectric fluid is present in the thermal management fluid in a total amount in the range of 75 wt % to 99.9 wt %, based on the total weight of the thermal management fluid. For example, in certain embodiments of the thermal management fluid as otherwise described herein, the dielectric fluid is present in a total amount in the range of 80 wt % to 99.9 wt %, for example, in the range of 85 wt % to 99.9 wt %, or 90 wt % to 99.9 wt %, or 95 wt % to 99.9 wt %, or 98 wt % to 99.9 wt %, based on the total weight of the thermal management fluid. In certain embodiments of the thermal management fluid as otherwise described herein, the dielectric fluid is present in a total amount in the range of 75 wt % to 99.5 wt %, for example, in the range 80 wt % to 99.5 wt %, or 85 wt % to 99.5 wt %, or 90 wt % to 99.5 wt %, or 95 wt % to 99.5 wt %, or 98 wt % to 99.5 wt %, based on the total weight of the thermal management fluid. In certain embodiments of the thermal management fluid as otherwise described herein, the dielectric fluid is present in a total amount in the range of 75 wt % to 99 wt %, for example, in the range of 80 wt % to 99 wt %, or 85 wt % to 99 wt %, or 90 wt % to 99 wt %, or 95 wt % to 99 wt %, based on the total weight of the thermal management fluid. In certain embodiments of the thermal management fluid as otherwise described herein, the dielectric fluid is present in a total amount in the range of 75 wt % to 98 wt %, for example, in the range of 80 wt % to 98 wt %, or 85 wt % to 98 wt %, or 90 wt % to 98 wt %, or 95 wt % to 98 wt %, based on the total weight of the thermal management fluid. In certain embodiments of the thermal management fluid as otherwise described herein, the dielectric fluid is present in a total amount in the range of 75 wt % to 95 wt %, e.g., in the range of 80 wt % to 95 wt %, or 85 wt % to 95 wt %, or 90 wt % to 95 wt %, or 80 wt % to 90 wt %, or 85 wt % to 90 wt %, or 80 wt % to 85 wt %, based on the total weight of the thermal management fluid. The total amount of the dielectric fluid can be selected in view of the disclosure herein based, for example, on the total amount of halocarbon(s) necessary to provide the desired cooling behavior, and on the amount of other additives necessary to provide desirable properties to the thermal management fluid.

As described above, the thermal management fluids of the disclosure include one or more halocarbons. As used herein, a "halocarbon" is an organic compound that includes one or more of fluorine, chlorine, bromine and iodine. The halocarbons of the disclosure may be partially halogenated compounds (i.e., in which there are one or more C-halogen bonds but also one or more C—H bonds in the structure of the compound) or fully halogenated compounds (i.e., in which there are C-halogen bonds and no C—H bonds in the compound, such as in perfluorinated compounds). As described in more detail below, the halocarbons of the disclosure may be, for example, in the form of halogenated aliphatic hydrocarbons, and/or oxygenates thereof.

Each of the one or more halocarbons has a boiling point (i.e. at 1 atm) in the range of 60 C to 200° C. The inventors have noted that halocarbons having such boiling points can advantageously help to provide a non-flammable vapor phase at elevated temperature, and thereby effectively increase the ignition temperature of the thermal management fluid of the disclosure. The identity (and thus the boiling point) of each of the one or more halocarbons can be selected based on desired operating temperatures of the particular system or process under consideration. Thus, in certain embodiments as otherwise described herein, each of the one or more halocarbons has a boiling point in the range of 70° C. to 200° C., for example, 85° C. to 200° C., or 100° C. to 200° C., or 125° C. to 200° C., or 150° C. to 200° C. In certain embodiments as otherwise described herein, each of the one or more halocarbons has a boiling point in the range of 60° C. to 175° C., for example, 70° C. to 175° C., or 85° C. to 175° C., or 100° C. to 175° C., or 125° C. to 175° C., or 150° C. to 175° C. In certain embodiments as otherwise described herein, each of the one or more halocarbons has a boiling point in the range of 60° C. to 150° C., for example, 70° C. to 150° C., or 85° C. to 150° C., or 100° C. to 150° C., or 125° C. to 150° C. In certain embodiments as otherwise described herein, each of the one or more halocarbons has a boiling point in the range of 60° C. to 125° C., for example, 70° C. to 125° C., or 85° C. to 125° C., or 100° C. to 125° C., or 70° C. to 100° C., or 85° C. to 100° C., or 70° C. to 85° C.

In certain embodiments as otherwise described herein, a thermal management fluid of the disclosure includes only a single halocarbon having a boiling point in the range of 60 to 200° C. However, the present inventors have noted that it can in some embodiments be preferable to provide the thermal management with two or more different halocarbons. The halocarbons can, in certain embodiments, have substantially different boiling points (e.g., at least 10° C. difference in boiling points, or at least 20° C. difference in boiling points, or even at least 50° C. difference in boiling points). For example, in certain embodiments, the thermal management fluid as otherwise described herein includes a first halocarbon having a boiling point in the range of 60° C. to 125° C. and a second halocarbon having a boiling point in the range of 150° C. to 200° C. In certain embodiments, the thermal management fluid as otherwise described herein includes a first halocarbon having a boiling point in the range of 60° C. to 100° C. and a second halocarbon having a boiling point in the range of 150° C. to 200° C. However, in other embodiments, two halocarbons in a thermal management fluid can have relatively similar boiling points (e.g., no more than 5° C. difference in boiling points, or no more than 2° C. difference in boiling points, or no more than 1° C. difference in boiling points). In either case, the two or more halocarbons may be selected to allow the tuning of viscosity and other physical properties of the overall thermal management fluid.

When two or more halocarbons are used in a thermal management fluid, the relative amounts of the two can be varied based on the disclosure herein, depending on the effect desired. In certain embodiments, the mass ratio of a first halocarbon to a second halocarbon is in the range of 1:9 to 9:1.

A variety of halocarbons can be used in the thermal management fluids of the disclosure. In certain embodiments as otherwise described herein, each of the one or more halocarbons includes as its halogen(s) one or more or of chlorine, fluorine and bromine, for example, one or more of chlorine and fluorine. In certain embodiments, each of the one or more halocarbons has fluorine as its halogen(s). A variety of sufficiently volatile halocarbons are available in the art, e.g., in the form of halogenated hydrocarbons and oxygenates thereof, halogenated aromatics and halogenated ethers. In certain embodiments as otherwise described herein, each of the one or more halocarbons may be selected from a fluorocarbon, chlorocarbon, chlorofluorocarbon, e.g., as halogenated alkanes or oxygenates thereof. For example, suitable fluorocarbons include, but are not limited to, fluoroalkanes and oxygenates thereof (such as perfluoroheptane, perfluorooctane, perfluoromethylcyclohexane, perfluoro-1,3-dimethylcyclohexane, perfluorodecalin, perfluoromethyldecalin, ethyl nonafluorobutyl ether, ethoxy-nonafluorobutane, tetradecafluoro-2-methylhexan-3-one, tetradecafluoro-2,4-dimethylpentan-3-one, 3-methoxyperfluoro(2-methylpentane), 3-ethoxyperfluoro(2-methylpentane), 3-ethoxyperfluoro(2-methylhexane), and 2,3,3,4,4-pentafluoro-5-methoxy-2,5-bis(perfluoropropan-2-yl)tetrahydrofuran), fluoroalkenes and oxygenates thereof (such as perfluorododecene), fluoroaromatic compounds, and fluorinated ethers (such as ethyl nonafluorobutyl ether). Suitable chlorocarbons include, but are not limited to, chloroalkanes and oxygenates thereof (such as dichloromethane, 1,1,1,2- and 1,1,2,2-tetrachloroethane, and pentachloroethane), chloroalkene and oxygenate thereof (such as 1,1,1-trichloroethylene and cis-1,2-dichloroethylene), and chloroaromatic compounds.

For example, in certain embodiments, each of the one or more halocarbons of a thermal management fluid as otherwise described herein is a fluorocarbon, e.g., a fluoroalkane. In certain embodiments, the thermal management fluid as otherwise described herein is wherein the one or more halocarbons includes an oxygenate of fluoroalkane. In certain embodiments, the thermal management fluid as otherwise described herein is wherein the one or more halocarbons includes a fluorocarbon and a chlorocarbon.

Some suitable commercially available halocarbons include those sold under the trade name NOVEC™ (e.g., Novec 774, 7200, 8200, 7300, 7300DL, 7500, and 7700) available from 3M, Saint Paul, Minnesota and those sold under the trade name GALDEN® (e.g., Galden HT70, HT80, HT119, HT135, HT170, and HT200) available from TMC Industries, Inc., Waconia, Minnesota.

Based on the disclosure herein, the one or more halocarbons can be selected to have viscosity relevant to the process or system of interest. For example, the each halocarbon can be selected to provide an overall lower viscosity to the thermal management fluid as compared to the viscosity of the dielectric fluid (e.g., by having a viscosity less than that of the dielectric fluid). Moreover, the one or more halocarbons can be selected to have low reactivity with respect to the other components of the systems in which they are used, as well as to provide the overall thermal management fluid with a desired heat capacity, and thermal conductivity. Other considerations when selecting the one or more halocarbons may include toxicity and environmental impact.

Advantageously, the halocarbon can be selected such that it has not only an intermediate boiling point as described above, but also a high flash point, or in some cases, even no flash point. In such cases, the halocarbon will have a significant vapor pressure in a headspace above the thermal management fluid, but will make the overall mixture of vapor in the headspace much more difficult to ignite (i.e., as compared to the case for the dielectric fluid alone). For example, in certain embodiments as otherwise described herein, each of the one or more halocarbons does not have a flash point of less than 150° C., e.g., less than 160° C., or less than 170° C., measured in accordance with ASTM D93. In certain embodiments, each of the one or more halocarbons does not have a flash point of less than 180° C., e.g., less than 190° C., or less than 200° C., measured in accordance with ASTM D93. In certain embodiments as otherwise described herein, each of the one or more halocarbons does not have a flash point measurable in accordance with ASTM D93.

The one or more halocarbons can be present in the thermal management fluids described herein in a variety of amounts. In certain embodiments as otherwise described herein, the one or more halocarbons is present in a total amount in the range of 0.1 wt % to 20 wt %, based on the total weight of the thermal management fluid. For example, in certain embodiments of the thermal management fluid as otherwise described herein, the one or more halocarbons are present in a total amount of 0.1 wt % to 15%, e.g., or 0.1 wt % to 10 wt %, or 0.1 wt % to 5 wt %, or 0.1 wt % to 2 wt %, based on the total weight of the thermal management fluid. In certain embodiments of the thermal management fluid as otherwise described herein, the one or more halocarbons are present in a total amount of 0.5 wt % to 20 wt %, e.g., 0.5 wt % to 15 wt %, or 0.5 wt % to 10 wt %, or 0.5 wt % to 5 wt %, or 0.5 wt % to 2 wt %, or 1 wt % to 20 wt %, or 1 wt % to 15 wt %, or 1 wt % to 10 wt %, or 1 wt % to 5 wt %, or 2 wt % to 20 wt %, or 2 wt % to 15 wt %, or 2 wt % to 10 wt %, or 2 wt % to 5 wt %, based on the total weight of the thermal management fluid. In certain embodiments of the thermal management fluid as otherwise described herein, the one or more halocarbons are present in a total amount of 5 wt % to 20 wt %, e.g., 5 wt % to 15 wt %, or 5 wt % to 10 wt %, or 10 wt % to 20 wt %, or 10 wt % to 15 wt %, or 15 wt % to 20 wt %, based on the total weight of the thermal management fluid. In certain embodiments of the thermal management fluid as otherwise described herein, the one or more halocarbons is present in a total amount of In certain embodiments of the thermal management fluid as otherwise described herein, the one or more halocarbons are present in a total amount of 1 wt % to 10 wt %, e.g., 1 wt % to 8 wt %, or 1 wt % to 5 wt %, or 2 wt % to 10 wt %, or 2 wt % to 8 wt %, or 2 wt % to 5 wt %, based on the total weight of the thermal management fluid. The person of ordinary skill in the art will, based on the disclosure herein, provide the halocarbon(s) in an amount to provide a desired high or unmeasurable flash point to the thermal management fluid, in addition with any other desired properties (e.g., viscosity).

Throughout this specification the term "homogeneously dispersed" means that the one or more halocarbons may be present as small particles (e.g. droplets up to 10 μm, up to 50 μm, or even up to 100 μm in diameter) that are evenly (or homogeneously) mixed throughout the thermal management fluid, or, more preferably, that the one or more halocarbons is essentially dissolved in the thermal management fluid. It is understood that the one or more halocarbons can be homogenously dispersed yet leave a minor residue undispersed, but this will be a very small amount, i.e., less than 1%, or 0.5%, or even 0.1% by weight of the halocarbon material.

As the person of ordinary skill in the art will appreciate based, the thermal management fluids of the disclosure can also include a variety of other components, such as those conventional in compositions for thermal management applications. Examples include, but are not limited to corrosion inhibitors, anti-oxidants (such as phenolic and aminic anti-oxidants), pour point depressants, antifoams, defoamers, viscosity index modifiers, preservatives, biocides, surfactants, seal swell additives, and combinations thereof. In certain embodiments, corrosion inhibitors, anti-oxidants (such as phenolic and aminic anti-oxidants), pour point depressants, antifoams, defoamers, viscosity index modifiers, preservatives, biocides, surfactants, seal swell additives, and combinations thereof, for example, may be present in an amount up to 5.0 wt %, based on the total weight of the thermal management fluid. In certain such embodiments, one or more of corrosion inhibitors, anti-oxidants (such as phenolic and aminic anti-oxidants), pour point depressants, antifoams, defoamers, viscosity index modifiers, preservatives, biocides, surfactants, seal swell additives, and combinations thereof are present in an amount in the range of 0.2 wt % to 5.0 wt %, or 1.0 wt % to 2.0 wt %, or 0.2 wt % to 1.0 wt %, or 0.2 wt % to 0.5 wt %, or 0.05 wt % to 0.2 wt %, based on the total weight of the thermal management fluid.

The person of ordinary skill in the art will appreciate that a variety of other components can be present in the thermal management fluids of the disclosure. However, the present inventors have determined that materials that are substantially made up of dielectric fluid in combination with halocarbon can provide the desirable activities and benefits as described herein. Thus, in certain desirable embodiments, the total amount of the dielectric fluid and the one or more halocarbons is at least 80 wt % of the total weight of the thermal management fluid. In certain such embodiments, at least 85 wt %, at least 90 wt %, at least 95%, at least 98 wt %, or even at least 98 wt %, of the total weight of the thermal management fluid is made up of the dielectric fluid and the one or more halocarbons. In certain embodiments as described herein, thermal management fluids of the disclosure are substantially free or free of other components and essentially only comprise or consist of the dielectric fluid and the one or more halocarbons.

Because there is always a risk that oxygen might enter the system, the thermal management fluids of the disclosure advantageously have a high flash point to prevent ignition. The present inventors have noted that halocarbons can have high, or in some cases, even no flash point. Accordingly, in desirable embodiments, the vaporization of the halocarbons does not pose a substantial ignition hazard, as they are not likely to ignite during operating conditions. And, as described above, the halocarbons can be present in the vapor phase above the thermal management fluid in such an amount as to inhibit the ignition of any vapor of the dielectric fluid that might be present. As described above, the thermal management fluids of the disclosure can lack a flash point less than 120° C., as measured in accordance with ASTM D93 ("Standard Test Methods for Flash Point by Pensky-Martens Closed Cup Tester"). For example, in certain embodiments, a thermal management fluid as otherwise described herein does not have a flash point of less than 130° C., e.g., less than 150° C., measured in accordance with ASTM D93. In certain embodiments, a thermal management fluid as otherwise described herein does not have a flash point less than 160° C., e.g., less than 170° C., measured in accordance with ASTM D93. In certain embodiments, a thermal management fluid as otherwise described herein does not have a flash point less than 180° C., e.g., less than 190° C., measured in accordance with ASTM D93. In certain embodiments, a thermal management fluid as otherwise described herein does not have a flash point less than 200° C., less than 210° C., less than 220° C., or less than 250° C., measured in accordance with ASTM D93. And in certain embodiments, a thermal management fluid as otherwise described herein does not have a flash point measurable in accordance with ASTM D93.

As described above, the inventors have determined that combination of halocarbon(s) with a dielectric fluid can greatly increase the effective flash point of the dielectric fluid (i.e., by providing a thermal management fluid with a much higher flash point). In certain embodiments as otherwise described herein, the thermal management fluid does not have a flash point that is less than 10 degrees more, e.g., less than 20 degrees more than the flash point of the dielectric fluid. In certain embodiments as otherwise described herein, the thermal management fluid does not have a flash point that is less than 35 degrees more, e.g., less than 50 degrees more than the flash point of the dielectric fluid.

A low viscosity is often desired for a thermal management fluid, to simplify the pumping thereof through a system, especially when relatively narrow passageways are used. The person of ordinary skill in the art will, based on the present disclosure, select components to provide the thermal management fluids with a desired viscosity, e.g., to be conveniently conducted through a system. Advantageously, a relatively low-viscosity dielectric fluid can be used as a base; even when such a dielectric fluid itself has a low flash point, the overall thermal management fluid can have a sufficiently high flash point to be safely used. Many halocarbons, especially fluorocarbons, also have low viscosity and can further lower the viscosity of the overall thermal management fluid. Accordingly, in certain embodiments, a thermal management fluids as otherwise described herein has a kinematic viscosity at 40° C. in the range of 2 to 20 cSt, e.g., in the range of 2 to 15 cSt, or 3 to 20 cSt, or 3 to 15 cSt, or 5 to 20 cSt, or 5 to 15 cSt. In certain embodiments, a thermal management fluids as otherwise described herein has a kinematic viscosity at 40° C. in the range of 2 to 10 cSt, e.g., 2 to 8 cSt, or 2 to 6 cSt, or 3 to 10 cSt, or 3 to 8 cSt, or 3 to 6 cSt, or 5 to 10 cSt, or 5 to 8 cSt, or 5 to 6 cSt, or 6 to 10 cSt, or 8 to 10 cSt, as measured in accordance with ASTM D455. And in certain embodiments, a thermal management fluids as otherwise described herein has a kinematic viscosity at 40° C. in the range of 2 to 5 cSt, or 2 to 4 cSt, or 2 to 3 cSt, or 3 to 5 cSt, or 3 to 4 cSt, or 4 to 5 cSt, as measured in accordance with ASTM D455.

In certain embodiments of the disclosure, the thermal management fluid of the disclosure may have density of no more than 1.1 g/cm$^3$ at 25° C. For example, in certain embodiments of the disclosure, the thermal management fluid of the disclosure may have density of no more than 1 g/cm$^3$ at 25° C.

In certain embodiments of the disclosure, the thermal management fluid of the disclosure may have a heat capacity of at least 1 J/g·K, or at least 1.2 J/g·K, or even at least 1.5 J/g·K at 25° C. In certain embodiments of the disclosure, the thermal management fluid of the disclosure may have a thermal conductivity in the range of 0.05 W/m·K to 1 W/m·K at 40° C.

The thermal management fluids of the disclosure are desirably dielectric, so that they can be used in direct cooling applications. Accordingly, they have a dielectric constant of at least 1.5 as measured at 25° C. The dielectric constant is measured using the coaxial probe method, e.g., using ASTM D924. In certain embodiments, a thermal management fluid of the disclosure has a dielectric constant of at least 1.75, at least 2.0, at least 2.25 as measured at 25° C. In certain embodiments, a thermal management fluid of the disclosure has a dielectric constant of at 1.5 to 10, or 1.8 to 10, or 1.5 to 2.8, or 1.8 to 2.8.

Another aspect of the disclosure provides a method comprising contacting a thermal management fluid as described herein with a surface having a temperature of at least 30° C., the surface being in substantial thermal communication with a heat source, and absorbing thermal energy in the thermal management fluid from the heat source through the surface. In certain embodiments, the method of the disclosure further includes condensing each vaporized halocarbon and returning it to the thermal management fluid. However, in other embodiments, one or more of the halocarbons (e.g., at a high temperature) may act as a thermal failsafe, and be vented from the system. In such cases, the system may need to be replenished with thermal management fluid (or, at least, the vented halocarbon component) before continuing operation—but in any event thermal runaway at an extreme temperature can be avoided.

The contacting of the thermal management fluid with the surface can be performed, e.g., by pumping or otherwise flowing the fluid over the surface.

The temperature of the surface can vary; the thermal management fluid can be adapted for use with a variety of temperatures. In certain embodiments, the temperature of the surface in the range of 25 C to 150° C., e.g., 25° C. to 100° C., or 25° C. to 90° C., or 25° C. to 85° C., or 25° C. to 80° C., or 25° C. to 75° C., or 25° C. to 70° C. In certain embodiments, the temperature of the surface in the range of 30 C to 150° C., e.g., 30° C. to 100° C., or 30° C. to 90° C., or 30° C. to 85° C., or 30° C. to 80° C., or 30° C. to 75° C., or 30° C. to 70° C. In certain embodiments as otherwise described herein, the temperature of the surface is in the range of 40° C. to 150° C., e.g., 50° C. to 150° C., or 60° C. to 150° C., or 70° C. to 150° C., or 80° C. to 150° C., or 90° C. to 150° C., or 100° C. to 150° C., or 110° C. to 150° C., or 30° C. to 100° C., or 40° C. to 100° C., or 50° C. to 100° C., or 60° C. to 100° C., or 70° C. to 100° C., or 80° C. to 100° C., or 30° C. to 90° C., or 40° C. to 90° C., or 50° C. to 90° C., or 60° C. to 90° C., or 30° C. to 85° C., or 40° C. to 85° C., or 45° C. to 85° C., or 50° C. to 85° C., or 60° C. to 85° C., or 30° C. to 80° C., or 40° C. to 80° C., or 45° C. to 80° C., or 50° C. to 80° C., or 60° C. to 80° C., or 30° C. to 75° C., or 40° C. to 75° C., or 45° C. to 75° C., or 50° C. to 75° C., or 60° C. to 75° C., or 30° C. to 70° C., or 40° C. to 70° C., or 45° C. to 70° C., or 50° C. to 70° C., or 60° C. to 70° C., or 65° C. to 75° C. The temperature of the surface in certain embodiments (and at certain times during operation of a device or system) is no more than a boiling point of any of the one or more halocarbons of the thermal management system. In certain embodiments, throughout the contacting, each of the one or more halocarbons does not reach its boiling point.

An embodiment of the method of the disclosure is illustrated with reference to FIG. 1. A thermal management circuit 100 is shown in a schematic cross-sectional side view in FIG. 1. The thermal management circuit 100 includes a thermal management fluid 120 that is circulated through the circuit and passes over surface 142. The temperature of surface 142 is elevated in comparison to the temperature of thermal management fluid 120. As a result, thermal energy is absorbed in thermal management fluid 120 from surface 142.

In certain embodiments as otherwise described herein, the method includes producing the thermal energy by operating an electrical component. For example, thermal management circuit 100 is associated with electrical component 140, which produces heat during operation. In certain embodiments the heat is produced as elements of the electrical component charge and discharge. As will be understood by those of ordinary skill in the art, inefficiencies in the operation of the electrical component and resistances in the circuits corresponding circuits create heat as current passes through the circuits and elements of the electrical component. For example, the heat from the operation of electrical component 140 causes surface 142 to rise in temperature, which then results in the transfer of thermal energy to thermal management fluid 120. In other embodiments, the thermal energy is produced by a chemical reaction, such as an exothermic reaction, or by friction. In still other embodiments, the thermal management fluid is chilled and absorbs thermal energy from surfaces at ambient or slightly elevated temperatures.

In certain embodiments as otherwise described herein, the electrical component includes a battery system, a capacitor, inverter, electrical cabling, a fuel cell, a motor, or a computer. For example, in certain embodiments the electrical component is a battery system that includes one or more electrochemical cells disposed in a housing. In other embodiments the electrical component is one or more capacitors, such as an electrolytic capacitor or an electric double-layer capacitor, e.g., a supercapacitor. In still other embodiments, the electrical component is one or more fuel cells, such as a polymer electrolyte membrane fuel cell, a direct methanol fuel cell, an alkaline fuel cell, a phosphoric acid fuel cell, a molten carbonate fuel cell, a solid oxide fuel cell, or a reversible fuel cell. In certain embodiments the electrical component is an electric motor. Still in other embodiments, the electrical component is a computer, for example a personal computer or a server.

The electrical component of the disclosure can operate on direct current (DC) or alternating current (AC). In certain embodiments as otherwise described herein, the electrical component operates at DC or AC voltage above 48 V. In certain embodiments as otherwise described herein, the electrical component operates at DC or AC voltage above 100 V, above 200 V, or above 300 V.

In certain embodiments as otherwise described herein, the surface is a surface of the electrical component. For example, in FIG. 1 a housing of 150 of electrical component 140 contains a reservoir of thermal management fluid 120. Elements of the electrical component including certain circuits that produce heat is submerged in thermal management fluid 120 and the thermal management fluid absorbs thermal energy directly from an outside surface 142 of the electrical component 140.

Figure 2:
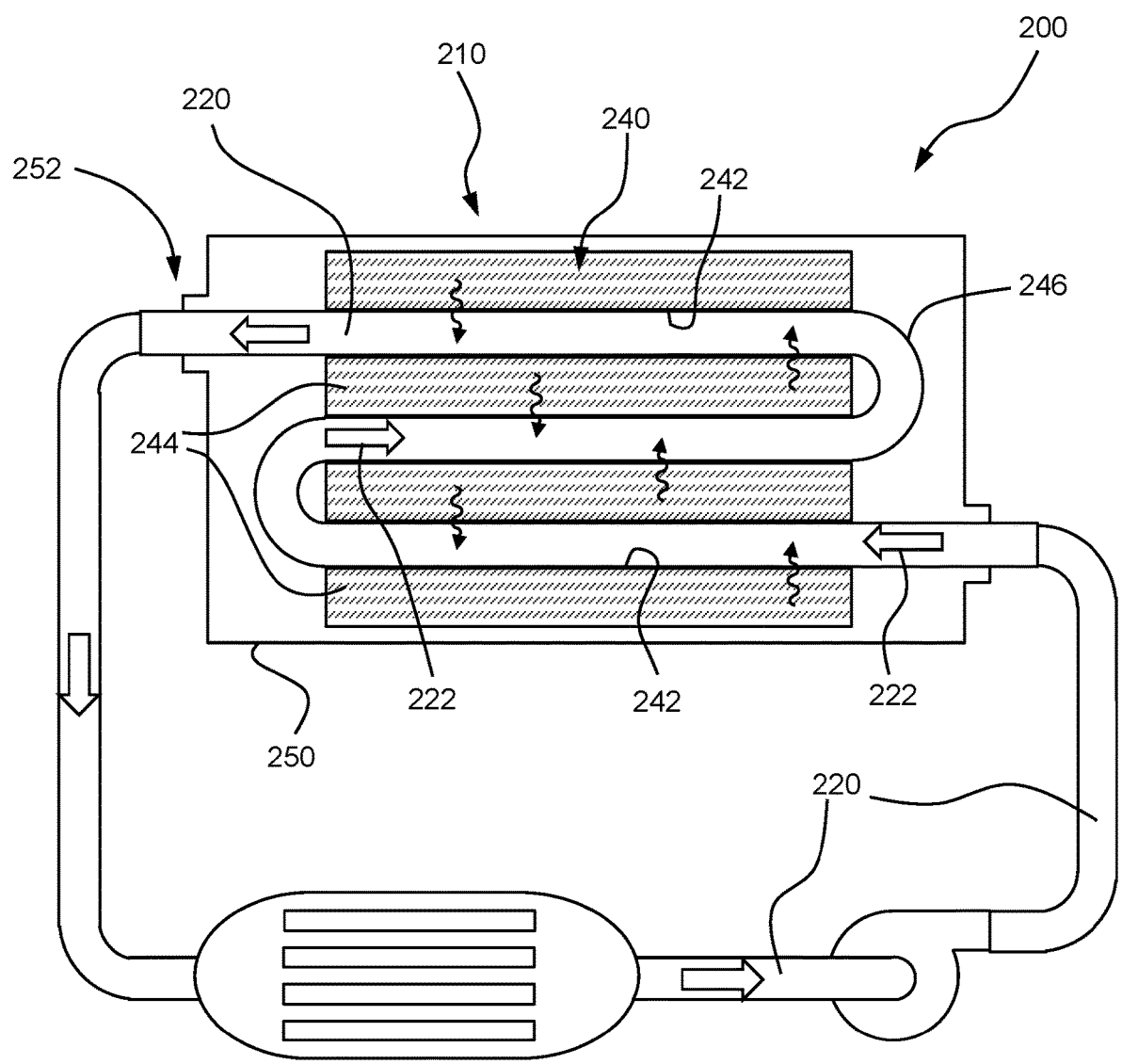
FIG. 2 is a schematic cross-sectional view of a thermal management circuit according to another embodiment of the disclosure.

In certain embodiments as otherwise described herein, the surface is an internal surface of a conduit. For example, FIG. 2 shows a thermal management circuit 200 that includes electrical component 240 that includes a plurality of individual units 244. In particular, the electrical component 240 is a battery that includes a plurality of electrochemical cells 244. Electrical component 240 further includes a conduit 246 that extends through the inside of the electrical component and between the electrochemical cells 244. As the electrical component produces thermal energy, the internal surface 242 of the conduit 246 is heated and the thermal energy is absorbed by the thermal management fluid 220.

In certain embodiments as otherwise described herein, the conduit passes through a housing that surrounds the electrical component. For example, conduit 246 in thermal management circuit 200 extends through apertures 252 in the housing 250 surrounding electrical component 240, which allow thermal management fluid 220 to be conveyed to other elements of the thermal management circuit 200.

Another aspect of the disclosure provides a battery system including: a housing; one or more electrochemical cells disposed in the housing; a fluid path extending through the housing and in substantial thermal communication with the one or more electrochemical cells; and a thermal management fluid according to any of the embodiments described above that is disposed in the fluid path. For example, thermal management circuit 200 in FIG. 2 includes battery system 210. The battery system includes a plurality of electrochemical cells 244 that are disposed inside housing 250. A conduit 246 forms a fluid path that extends through the housing. Thermal management fluid 220 disposed in conduit 246 is thereby placed in thermal communication with the electrochemical cells 244. As the electrochemical cells 244 charge and discharge they produce heat which is absorbed by the thermal management fluid 220. In certain embodiments the electrochemical cells are subject to fast charging which yields a large amount of heat. The high heat capacity of the thermal management fluid is able to absorb this large amount of heat quickly as it is produced.

In certain embodiments as otherwise described herein, the fluid path is at least partially defined by a cavity of the housing. For example, in certain embodiments at least a portion of the fluid path is formed between the electrochemical cells and the inside wall of the housing, similar to fluid path 122 in component 140.

In certain embodiments as otherwise described herein, the fluid path is at least partially defined by at least one conduit disposed in the housing. For example, in battery system 210, conduit 246 provides the fluid path 222 through the housing 250.

Figure 3A:
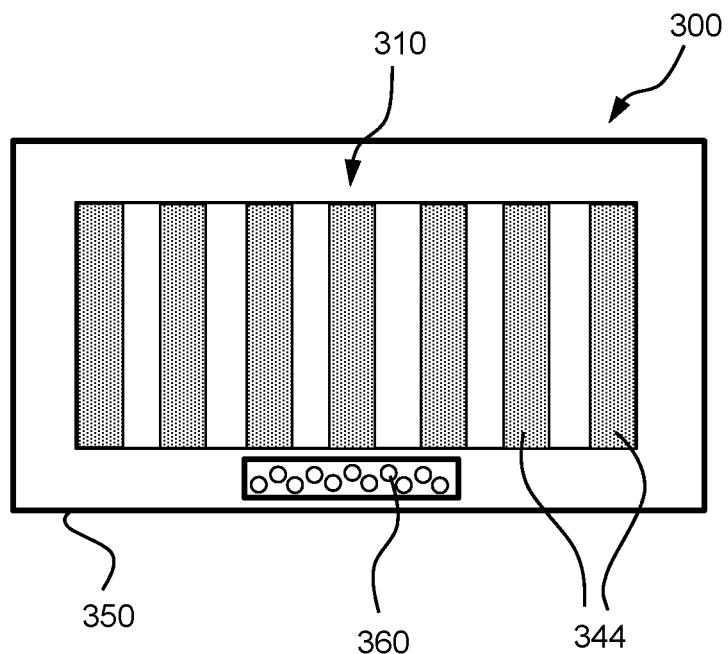
FIG. 3A is a schematic cross-sectional view of a thermal management circuit according to an embodiment of the disclosure.
Figure 3B:
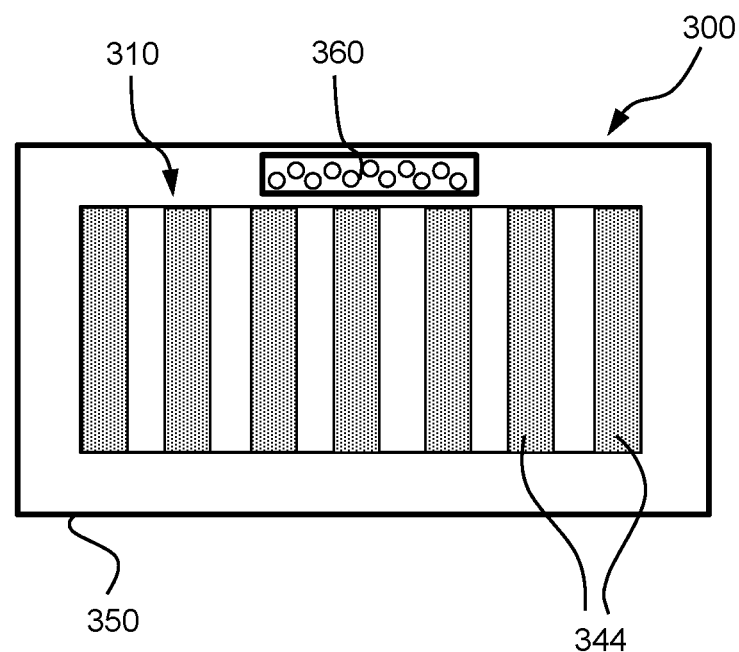
FIG. 3B is a schematic cross-sectional view of a thermal management circuit according to an embodiment of the disclosure.

Because the thermal management fluids generally cool electrical components, it is important that they remain free from water contamination in order to maintain their electrically insulating properties. Water is generally not miscible with dielectric fluids. Small amounts (low ppm) of water may be dissolved in dielectric fluid. Larger amounts will cause the water to phase separate into a second liquid layer. Therefore, it is desirable to remove any water from the battery system. In certain embodiments as otherwise described herein, the battery system further comprises an immobilized desiccant material disposed in the fluid path. For example, thermal management circuit 300 in FIGS. 3A and 3B includes battery system 310 including a plurality of electrochemical cells 344 that are disposed inside housing 350. The battery system includes an immobilized desiccant 360 that is disposed inside housing 350. Generally, the immobilized desiccant may be deployed where the water layer would be expected to form. For example, when the thermal management fluid has density less than 1 g/cm$^3$ (i.e., less than density of water), the immobilized desiccant may be disposed at a bottom inner surface of the housing (i.e., at the bottom of the battery pack as normally employed) as shown in FIG. 3A. In another example, the immobilized desiccant may be disposed at a top inner surface of the housing (i.e., at the top of the battery pack as normally employed) as shown in FIG. 3B when the thermal management fluid has density more than 1 g/cm$^3$ (i.e., more than density of water).

The immobilized desiccant material of the disclosure may be in the form of solid particles or granules, and those solids particles or granules are restrained within the battery system, for example in a container. In certain embodiments as otherwise described herein, the container is in the form of a pouch including one or more walls of a permeable material that form a storage space within the pouch, and wherein the desiccant material is disposed in the storage space. In certain embodiments, the container comprises a case having an outer wall that forms a storage space therein, wherein the desiccant material is disposed in the storage space, and wherein at least a portion of the outer wall is porous.

In certain embodiments as otherwise described herein, the container comprises a case an inlet formed by a first porous section of the outer wall and an outlet formed by a second porous section of the outer wall. In some embodiments, the outer wall includes a plurality of porous sections, each of which forms an inlet. In other embodiments, a plurality of porous sections in the outer wall form outlets from the case. Still in other embodiments, the case includes more than one inlet formed by porous sections in the outer wall and more than one outlet formed by other porous sections in the outer wall. Still in other embodiments the entire outer wall can be porous. For example, in some embodiments the outer wall is formed by wall sections that are each in the form of a screen.

The particular amounts and identities of the desiccant material can be selected based on the disclosure here in to provide sufficient water removal. Various desiccant materials are known in the art and can suitably be used in the compositions, systems and methods described herein. For example, suitable desiccant materials include, but are not limited to molecular sieves, silica gel, zeolite, activated charcoal, calcium chloride, magnesium sulfate, sodium sulfate, or a combination thereof. The amount of desiccant material is determined based on the anticipated amount of water in the system. In certain embodiments, the amount of desiccant material will be sufficient to maintain water level in the system to less than 100 ppm. In certain embodiments, desiccant material may be present in an amount up to 5.0 wt %, based on the total weight of the thermal management fluid. For example, the desiccant material is present in an amount in the range of 0.2 wt % to 5.0 wt %, or 1.0 wt % to 2.0 wt %, or 0.2 wt % to 1.0 wt %, or 0.2 wt % to 0.5 wt %, or 0.05 wt % to 0.2 wt %, based on the total weight of the thermal management fluid.

In certain embodiments, the desiccant material may be combined with materials suitable for removing insoluble particles that settle out of the fluid (i.e., particle trap materials).

In certain embodiments as otherwise described herein, the electrochemical cells are lithium-ion electrochemical cells. In other embodiments, the electrochemical cells are aluminum ion cells, lead-acid cells, or magnesium ion cells.

In certain embodiments as otherwise described herein, the battery system is a component of an electric vehicle. In some embodiments, the electric vehicle is a fully electric vehicle or a hybrid electric vehicle. In other embodiments the battery system is component of a power motor, for example an electric motor or a motor in power electronics. In other embodiments the battery system is part of a stationary energy storage solution, for example a home energy storage solution that operates in cooperation with local renewable energy sources, such as solar panels or wind turbines.

Another aspect of the disclosure provides a thermal management circuit including a fluid path extending around and/or through a heat source; a thermal management fluid of according to any of embodiments described above, disposed in and configured to circulate in the fluid path and to absorb thermal energy produced by the heat source, wherein the fluid is disposed in the fluid path, the heat exchanger, the pump and the connecting duct. For example, thermal management circuit 100 shown in FIG. 1 includes a fluid path 122 that runs around electrical component 140. Thermal management fluid 120 flows through path 122 absorbing thermal energy from electronic component 140. From fluid path 122, the thermal management fluid 120 flows through a first duct 130 to heat exchanger 160. Thermal energy that has accumulated in thermal management fluid 120 is removed from the fluid within heat exchanger 160 before the fluid flows through a second duct 132 to pump 170. After pump 170, the thermal management fluid 120 passes through a third duct 134 returning it to fluid path 122 surrounding electrical component 140. Circuit 100, shown in FIG. 1, is a schematic depiction of an uncomplicated embodiment employing the described thermal management fluid. In other embodiments, the thermal management circuit includes additional elements, such as any combination of valves, pumps, heat exchangers, reservoirs and ducts.

In certain embodiments of the as otherwise described herein, the heat source is a battery including a plurality of electrochemical cells, and wherein the fluid path passes between at least two of the electrochemical cells.

In certain embodiments as otherwise described herein, the fluid path is defined by a housing around the electrical component. For example, housing 150 in FIG. 1 surrounds electrical component 140 and provides a cavity for thermal management fluid 120. Electrical component 140 is held in the housing at a distance from the walls of housing 150, which allows a path for thermal management fluid 120 to form between the housing 150 and the electrical component 140. While housing 150 has an enclosed shape with specific apertures 152 providing access for thermal management fluid 120, in other embodiments the top of the housing is open and the thermal management fluid is retained in the housing by gravity.

In certain embodiments as otherwise described herein, the fluid path is configured to position the thermal management fluid in substantial thermal communication with the electrical component so as to absorb thermal energy produced by the electrical component. For example, in thermal management circuit 100 fluid path 122 extends around electrical component 140 and is in direct contact with the surfaces of electrical component 140. Further, in thermal management circuit 200 fluid path 222 passes through a conduit 246 that runs adjacent to the elements of electrical component 240. In both cases, the fluid path places thermal management fluid in close proximity to the electrical component so that the thermal management fluid readily absorbs thermal energy from the component.

In certain embodiments as otherwise described herein, the thermal management circuit further includes a heat exchanger in fluid communication with the fluid path, wherein the thermal management fluid is configured to circulate between the fluid path and the heat exchanger to dissipate heat through the heat exchanger. In certain embodiments as otherwise described herein, the heat exchanger is configured to remove heat from the thermal management fluid. For example, in thermal management circuit 100, after thermal management fluid 120 is pumped out of housing 150 it passes to heat exchanger 160 where the thermal energy is transferred to a cooler fluid, such as ambient air or a cooling liquid.

In certain embodiments as otherwise described herein, the thermal management circuit includes a battery system according to any of the embodiments described above. For example, thermal management circuit 200 includes battery system 210. In certain embodiments as otherwise described herein, the thermal management circuit includes an immobilized desiccant material disposed according to any of the embodiments described above. For example, thermal management circuit 300 includes battery desiccant material 360.

The particulars shown herein are by way of example and for purposes of illustrative discussion of certain embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice. Thus, before the disclosed processes and devices are described, it is to be understood that the aspects described herein are not limited to specific embodiments, apparatus, or configurations, and as such can, of course, vary. It is also to be understood that the terminology used herein is for the purpose of describing particular aspects only and, unless specifically defined herein, is not intended to be limiting.

The terms "a," "an," "the" and similar referents used in the context of describing the invention (especially in the context of the following embodiments and claims) are to be construed to cover both the singular and the plural, unless otherwise indicated herein or clearly contradicted by context.

All methods described herein can be performed in any suitable order of steps unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

As will be understood by one of ordinary skill in the art, each embodiment disclosed herein can comprise, consist essentially of or consist of its particular stated element, step, ingredient or component. As used herein, the transition term "comprise" or "comprises" means includes, but is not limited to, and allows for the inclusion of unspecified elements, steps, ingredients, or components, even in major amounts. The transitional phrase "consisting of" excludes any element, step, ingredient or component not specified. The transition phrase "consisting essentially of" limits the scope of the embodiment to the specified elements, steps, ingredients or components and to those that do not materially affect the embodiment.

All percentages, ratios and proportions herein are by weight, unless otherwise specified.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Some embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Various exemplary embodiments of the disclosure include, but are not limited to the enumerated embodiments listed below, which can be combined in any number and in any combination that is not technically or logically inconsistent.

Embodiment 1 provides a thermal management fluid comprising:
 a dielectric fluid comprising one or more dielectric substances, the dielectric fluid having a flash point less than 150° C. measured in accordance with ASTM D93 and having a dielectric constant of at least 1.5 at 25° C., the dielectric fluid being present in a total amount in the range of 75 wt % to 99.9 wt %; and
 one or more halocarbons each having a boiling point in the range of 60° C. to 200° C., present in a total amount in the range of 0.1 wt % to 20 wt %,
wherein the one or more halocarbons are homogeneously dispersed in the thermal management fluid; and
wherein the thermal management fluid does not have a flash point less than 120° C., measured in accordance with ASTM D93, and the thermal management fluid has a dielectric constant of at least 1.5 at 25° C.

Embodiment 2 provides the thermal management fluid of embodiment 1, wherein the dielectric fluid has a flash point of no more than 140° C., e.g., no more than 120° C. or no more than 100° C.

Embodiment 3 provides the thermal management fluid of embodiment 1, wherein the dielectric fluid has a flash point of no more than 80° C., e.g., no more than 60° C., or even no more than 55° C. measured in accordance with ASTM D93.

Embodiment 4 provides the thermal management fluid of any of embodiments 1-3, wherein the dielectric fluid has a kinematic viscosity at 40° C. in the range of 2 to 20 cSt, e.g., in the range of 2 to 15 cSt, or 3 to 20 cSt, or 3 to 15 cSt, or 5 to 20 cSt, as measured in accordance with ASTM D455.

Embodiment 5 provides the thermal management fluid of any of embodiments 1-3, wherein the dielectric fluid has a kinematic viscosity at 40° C. in the range of 2 to 10 cSt, e.g., 2 to 8 cSt, or 2 to 6 cSt, or 3 to 10 cSt, or 3 to 8 cSt, or 3 to 6 cSt, or 5 to 10 cSt, or 5 to 8 cSt, or 5 to 6 cSt, or 6 to 10 cSt, or 8 to 10 cSt, as measured in accordance with ASTM D455.

Embodiment 6 provides the thermal management fluid of any of embodiments 1-3, wherein the dielectric fluid has a kinematic viscosity at 40° C. in the range of 2 to 5 cSt, or 2 to 4 cSt, or 2 to 3 cSt, or 3 to 5 cSt, or 3 to 4 cSt, or 4 to 5 cSt, as measured in accordance with ASTM D455.

Embodiment 7 provides the thermal management fluid of any of embodiments 1-6, wherein each of the one or more dielectric substances is selected from aliphatics (e.g., $C_6$-$C_{50}$ alkyls, polyolefins such as poly-α-olefin), aliphatic oxygenates (e.g., ketones, ethers, esters, or amides), aromatics (e.g., dialkylbenzene such as diethylbenzene, cyclohexylbenzene, 1-alkylnaphthalene, 2-alkylnaphthalene, dibenzyltoluene, and alkylated biphenyl), aromatic oxygenates (e.g., ketones, ethers, esters, or amides), silicones (e.g., silicone oil and silicate ester), and any combination thereof.

Embodiment 8 provides the thermal management fluid of any of embodiments 1-6, wherein each of the one or more dielectric substances is selected from $C_{14}$-$C_{50}$ alkyls, polyolefins, and any combination thereof.

Embodiment 9 provides the thermal management fluid of any of embodiments 1-8, wherein the dielectric fluid is a Group II, Group III, Group IV, or Group V base oil.

Embodiment 10 provides the thermal management fluid of any of embodiments 1-8, wherein the dielectric fluid is a Group II base oil.

Embodiment 11 provides the thermal management fluid of any of embodiments 1-8, wherein the dielectric fluid is a Group IV base oil (such as polyalphaolefins (PAO)).

Embodiment 12 provides the thermal management fluid of any of embodiments 1-11, wherein the dielectric fluid is present in an amount in the range of 80 wt % to 99.9 wt %, for example, 85 wt % to 99.9 wt %, or 90 wt % to 99.9 wt %, or 95 wt % to 99.9 wt %, or 98 wt % to 99.9 wt %.

Embodiment 13 provides the thermal management fluid of any of embodiments 1-11, wherein the dielectric fluid is present in an amount in the range of 75 wt % to 99.5 wt %, for example, 80 wt % to 99.5 wt %, or 85 wt % to 99.5 wt %, or 90 wt % to 99.5 wt %, or 95 wt % to 99.5 wt %, or 98 wt % to 99.5 wt %, or 75 wt % to 99 wt %, or 80 wt % to 99 wt %, or 85 wt % to 99 wt %, or 90 wt % to 99 wt %, or 95 wt % to 99 wt %, or 75 wt % to 98 wt %, or 80 wt % to 98 wt %, or 85 wt % to 98 wt %, or 90 wt % to 98 wt %, or 95 wt % to 98 wt %.

Embodiment 14 provides the thermal management fluid of any of embodiments 1-11, wherein the dielectric fluid is present in an amount in the range of 75 wt % to 95 wt %, e.g., 80 wt % to 95 wt %, or 85 wt % to 95 wt %, or 90 wt % to 95 wt %, or 80 wt % to 90 wt %, or 85 wt % to 90 wt %, or 80 wt % to 85 wt %.

Embodiment 15 provides the thermal management fluid of any of embodiments 1-14, wherein each of the one or more halocarbons has a boiling point in the range of 70° C. to 200° C., for example, 85° C. to 200° C., or 100° C. to 200° C., or 125° C. to 200° C., or 150° C. to 200° C.

Embodiment 16 provides the thermal management fluid of any of embodiments 1-14, wherein each of the one or more halocarbons has a boiling point in the range of 60° C. to 175° C., for example, 70° C. to 175° C., or 85° C. to 175° C., or 100° C. to 175° C., or 125° C. to 175° C., or 150° C. to 175° C.

Embodiment 17 provides the thermal management fluid of any of embodiments 1-14, wherein each of the one or more halocarbons has a boiling point in the range of 60° C. to 150° C., for example, 70° C. to 150° C., or 85° C. to 150° C., or 100° C. to 150° C., or 125° C. to 150° C.

Embodiment 18 provides the thermal management fluid of any of embodiments 1-14, wherein each of the one or more halocarbons has a boiling point in the range of 60° C. to 125° C., for example, 70° C. to 125° C., or 85° C. to 125° C., or 100° C. to 125° C., or 70° C. to 100° C., or 85° C. to 100° C., or 70° C. to 85° C.

Embodiment 19 provides the thermal management fluid of any of embodiments 1-18, wherein each of the one or more halocarbons includes as its halogen(s) one or more of chlorine, fluorine and bromine.

Embodiment 20 provides the thermal management fluid of any of embodiments 1-18, wherein each of the one or more halocarbons includes as its halogen(s) one or more of chlorine and fluorine.

Embodiment 21 provides the thermal management fluid of any of embodiments 1-18, wherein each of the one or more halocarbons has fluorine as its halogen(s).

Embodiment 22 provides the thermal management fluid of any of embodiments 1-18, wherein at least one of the one or more halocarbons is a fluorocarbon selected from fluoroalkanes and oxygenates thereof (such as perfluoroheptane, perfluorooctane, perfluoromethylcyclohexane, perfluoro-1,3-dimethylcyclohexane, perfluorodecalin, perfluoromethyldecalin, ethyl nonafluorobutyl ether, ethoxy-nonafluorobutane, tetradecafluoro-2-methylhexan-3-one, tetradecafluoro-2,4-dimethylpentan-3-one, 3-methoxyperfluoro(2-methylpentane), 3-ethoxyperfluoro(2-methylpentane), 3-ethoxyperfluoro(2-methylhexane), and 2,3,3,4,4-pentafluoro-5-methoxy-2,5-bis(perfluoropropan-2-yl)tetrahydrofuran), fluoroalkenes and oxygenates thereof (such as perfluorododecene), fluoroaromatic compounds, and fluorinated ethers (such as ethyl nonafluorobutyl ether).

Embodiment 23 provides the thermal management fluid of any of embodiments 1-18, wherein at least one of the one or more halocarbons is a chlorocarbon selected from chloroalkanes and oxygenates thereof (such as 1,1,1,2- and 1,1,2,2-tetrachloroethane, and pentachloroethane), chloroalkene and oxygenate thereof (such as 1,1,1-trichloroethylene and cis-1,2-dichloroethylene), and chloroaromatic compounds.

Embodiment 24 provides the thermal management fluid of any of embodiments 1-23, wherein each of the one or more halocarbons does not have a flash point of less than 150° C., e.g., less than 160° C., or less than 170° C. measured in accordance with ASTM D93.

Embodiment 25 provides the thermal management fluid of any of embodiments 1-23, wherein each of the one or more halocarbons does not have a flash point of less than 180° C., e.g., less than 190° C., or less than 200° C. measured in accordance with ASTM D93.

Embodiment 26 provides the thermal management fluid of any of embodiments 1-23, wherein each of the one or more halocarbons does not have a flash point measurable in accordance with ASTM D93.

Embodiment 27 provides the thermal management fluid of any of embodiments 1-26, wherein the one or more halocarbons are present in a total amount in the range of 0.1 wt % to 20%, e.g., 0.1 wt % to 15 wt %, or 0.1 wt % to 10 wt %, or 0.1 wt % to 5 wt %, or 0.1 wt % to 2 wt %.

Embodiment 28 provides the thermal management fluid of any of embodiments 1-26, wherein the one or more halocarbons are present in a total amount in the range of 0.5 wt % to 20 wt %, e.g., 0.5 wt % to 15 wt %, or 0.5 wt % to 10 wt %, or 0.5 wt % to 5 wt %, or 0.5 wt % to 2 wt %, or 1 wt % to 20 wt %, or 1 wt % to 15 wt %, or 1 wt % to 10 wt %, or 1 wt % to 5 wt %, or 2 wt % to 20 wt %, or 2 wt % to 15 wt %, or 2 wt % to 10 wt %, or 2 wt % to 5 wt %.

Embodiment 29 provides the thermal management fluid of any of embodiments 1-28, wherein the one or more halocarbons are present in a total amount in the range of 5 wt % to 20 wt %, e.g., 5 wt % to 15 wt %, or 5 wt % to 10 wt %, or 10 wt % to 20 wt %, or 10 wt % to 15 wt %, or 15 wt % to 20 wt % based on the weight of the thermal management fluid.

Embodiment 30 provides the thermal management fluid of any of embodiments 1-29, wherein the total amount of the dielectric fluid and the one or more halocarbons in the thermal management fluid is at least 80%, e.g., at least 85%, or at least 90%, or at least 95%, or at least 98%, or at least 99%.

Embodiment 31 provides the thermal management fluid of any of embodiments 1-30, wherein the thermal management fluid does not have a flash point less than 130° C., e.g., less than 150° C., 160° C., or 170° C., measured in accordance with ASTM D93.

Embodiment 32 provides the thermal management fluid of any of embodiments 1-30, wherein the thermal management fluid does not have a flash point less than 180° C., e.g., less than 190° C., measured in accordance with ASTM D93.

Embodiment 33 provides the thermal management fluid of any of embodiments 1-30, wherein the thermal management fluid does not have a flash point less than 200° C., less than 210° C., less than 220° C., or less than 250° C., measured in accordance with ASTM D93.

Embodiment 34 provides the thermal management fluid of any of embodiments 1-30, wherein the thermal management fluid has no measurable flash point in accordance with ASTM D93.

Embodiment 35 provides the thermal management fluid of any of embodiments 1-34, wherein the thermal management fluid does not have a flash point that is less than 10 degrees more than the flash point of the dielectric fluid.

Embodiment 36 provides the thermal management fluid of any of embodiments 1-34, wherein the thermal management fluid does not have a flash point that is less than 20 degrees more than the flash point of the dielectric fluid.

Embodiment 37 provides the thermal management fluid of any of embodiments 1-36, having a kinematic viscosity at 40° C. in the range of 2 to 20 cSt, e.g., in the range of 2 to 15 cSt, or 3 to 20 cSt, or 3 to 15 cSt, or 5 to 20 cSt, as measured in accordance with ASTM D455.

Embodiment 38 provides the thermal management fluid of any of embodiments 1-36, having a kinematic viscosity at 40° C. in the range of 2 to 10 cSt, e.g., 2 to 8 cSt, or 2 to 6 cSt, or 3 to 10 cSt, or 3 to 8 cSt, or 3 to 6 cSt, or 5 to 10 cSt, or 5 to 8 cSt, or 5 to 6 cSt, or 6 to 10 cSt, or 8 to 10 cSt, as measured in accordance with ASTM D455.

Embodiment 39 provides the thermal management fluid of any of embodiments 1-36, having a kinematic viscosity at 40° C. in the range of 2 to 5 cSt, or 2 to 4 cSt, or 2 to 3 cSt, or 3 to 5 cSt, or 3 to 4 cSt, or 4 to 5 cSt, as measured in accordance with ASTM D455.

Embodiment 40 provides the thermal management fluid of any of embodiments 1-39, having density of no more than 1 g/cm$^3$ at 25° C.

Embodiment 41 provides the thermal management fluid of any of embodiments 1-39, having density of no more than 1.1 g/cm$^3$ at 25° C.

Embodiment 42 provides a battery system comprising:
a housing;
one or more electrochemical cells disposed in the housing;
a fluid path extending in the housing and in substantial thermal communication with the one or more electrochemical cells; and
a thermal management fluid of any of embodiments 1-41 disposed in the fluid path.

Embodiment 43 provides the battery system of embodiment 42, further comprising an immobilized desiccant material disposed in the fluid path, the desiccant material being configured to remove aqueous contaminants in the thermal management fluid that passes through the fluid path.

Embodiment 44 provides the battery system of embodiment 43, wherein the immobilized desiccant material disposed in the fluid path is disposed at a bottom inner surface of the housing.

Embodiment 45 provides the battery system of embodiment 44, wherein the thermal management fluid has a density less than 1 g/cm$^3$.

Embodiment 46 provides the battery system of embodiment 43, wherein the immobilized desiccant material disposed in the fluid path is at a top inner surface of the housing.

Embodiment 47 provides the battery system of embodiment 46, wherein the thermal management fluid has a density more than 1 g/cm$^3$.

Embodiment 48 provides the battery system of any of embodiments 42-47, further comprising a container that holds the desiccant material, e.g., in a form of solid particles or granules.

Embodiment 49 provides the battery system of embodiment 48, wherein the container is in the form of a pouch including one or more walls of a permeable material that form a storage space within the pouch, and wherein the desiccant material is disposed in the storage space.

Embodiment 50 provides the battery system of embodiment 48, wherein the container comprises a case having an outer wall that forms a storage space therein, wherein the desiccant material is disposed in the storage space, and wherein at least a portion of the outer wall is porous.

Embodiment 51 provides the battery system of embodiment 50, wherein the case has an inlet formed by a first porous section of the outer wall and an outlet formed by a second porous section of the outer wall.

Embodiment 52 provides the battery system of any of embodiments 48-51, wherein the desiccant material is molecular sieves, silica gel, zeolite, activated charcoal, calcium chloride, magnesium sulfate, sodium sulfate, or a combination thereof.

Embodiment 53 provides the battery system of any of embodiments 48-51, wherein the amount of desiccant material is sufficient to maintain water level in the system to less than 100 ppm.

Embodiment 54 provides the battery system of any of embodiments 42-53, wherein the electrochemical cells are lithium-ion electrochemical cells.

Embodiment 55 provides an electric vehicle comprising the battery system of any of embodiments 42-52.

Embodiment 56 provides a thermal management circuit comprising:
a fluid path extending around and/or through a heat source;
a thermal management fluid of any of embodiments 1-41, disposed in and configured to circulate in the fluid path and to absorb thermal energy produced by the heat source,
wherein the fluid is disposed in the fluid path, the heat exchanger, the pump and the connecting duct.

Embodiment 57 provides the thermal management circuit of embodiment 56 further comprising an immobilized desiccant material disposed in the fluid path, the desiccant material being configured to remove aqueous contaminants in the thermal management fluid that passes through the fluid path.

Embodiment 58 provides the thermal management circuit of embodiment 57, wherein the immobilized desiccant material disposed in the fluid path at a bottom inner surface of the housing.

Embodiment 59 provides the thermal management circuit of embodiment 58, wherein the thermal management fluid has a density less than 1 $g/cm^3$.

Embodiment 60 provides the thermal management circuit of embodiment 57, wherein the immobilized desiccant material disposed at a top inner surface of the housing.

Embodiment 61 provides the thermal management circuit of embodiment 60, wherein the thermal management fluid has a density more than 1 $g/cm^3$.

Embodiment 62 provides the thermal management circuit of any of embodiments 57-61, further comprising a container that holds the desiccant material, e.g., in a form of solid particles or granules.

Embodiment 63 provides the thermal management circuit of embodiment 62, wherein the container is in the form of a pouch including one or more walls of a permeable material that form a storage space within the pouch, and wherein the desiccant material is disposed in the storage space.

Embodiment 64 provides the thermal management circuit of embodiment 62, wherein the container comprises a case having an outer wall that forms a storage space therein, wherein the active material is disposed in the storage space, and wherein at least a portion of the outer wall is porous.

Embodiment 65 provides the thermal management circuit of any of embodiments 57-64, wherein the desiccant material is molecular sieves, silica gel, zeolite, activated charcoal, calcium chloride, magnesium sulfate, sodium sulfate, or a combination thereof.

Embodiment 66 provides the thermal management circuit of any of embodiments 57-65, wherein the amount of desiccant material is sufficient to maintain water level in the system to less than 100 ppm.

Embodiment 67 provides a method comprising:
contacting a thermal management fluid of embodiments 1-41 with a surface having a temperature of at least 25° C., the surface being in substantial thermal communication with a heat source; and
absorbing thermal energy in the thermal management fluid from the heat source through the surface.

Embodiment 68 provides the method according to embodiment 67, wherein the surface has a temperature of at least 30° C., e.g., at least 40° C., at least 50° C., at least 60° C., or at least 70° C.

Embodiment 69 provides the method according to embodiment 67 or embodiment 68, wherein during the contacting, the surface has a temperature of no more than a boiling point of any of the one or more halocarbons.

Embodiment 70 provides the method according to any of embodiments 67-69, wherein throughout the contacting, each of the one or more halocarbons does not reach its boiling point.

Embodiment 71 provides the method according to any of embodiments 67-70, wherein the contacting is performed by circulating the thermal management fluid between a reservoir and the surface.

Embodiment 72 provides the method according to any of embodiments 67-71, wherein the contacting is performed by circulating the thermal management fluid between a heat exchanger and the surface.

Embodiment 73 provides the method of any of embodiments 67-72, further comprising passing the thermal management fluid over an immobilized desiccant material, the desiccant material being configured to remove aqueous contaminants in the thermal management fluid that passes over the desiccant material.

Numerous references have been made to patents and printed publications throughout this specification. Each of the cited references and printed publications are individually incorporated herein by reference in their entirety.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

We claim:

1. A thermal management circuit comprising:
a fluid path, a heat exchanger, a pump, and a connecting duct;
a fluid path extending around and/or through a heat source;
a thermal management fluid, disposed in and configured to circulate in the fluid path and to absorb thermal energy produced by the heat source,
wherein the fluid is disposed in the fluid path, the heat exchanger, the pump and the connecting duct;
wherein the thermal management fluid comprises:
a dielectric fluid comprising one or more dielectric substances each selected from $C_{14}$-$C_{50}$ alkyls and polyolefins, the dielectric fluid being a Group II, Group III, or Group IV base oil, the dielectric fluid having a kinematic viscosity at 40° C. in the range of 2 to 20 cSt as measured in accordance with ASTM D455, having a flash point less than 150° C. measured in accordance with ASTM D93 and having a dielectric constant of at least 1.5 at 25° C., the dielectric fluid being present in a total amount in the range of 75 wt % to 99.9 wt %; and
one or more fluorocarbons each having a boiling point in the range of 60° C. to 200° C., present in a total amount in the range of 0.1 wt % to 20 wt %, wherein the one or more fluorocarbons are homogeneously dispersed in the thermal management fluid; and
wherein the thermal management fluid does not have a flash point less than 120° C., measured in accordance with ASTM D93, and the thermal management fluid has a dielectric constant of at least 1.5 at 25° C.

2. The thermal management circuit of claim 1, wherein the thermal management fluid has a density less than 1 g/cm$^3$.

3. The thermal management circuit of claim 1, wherein the dielectric fluid is present in an amount in the range of 80 wt % to 99.9 wt %.

4. The thermal management circuit of claim 1, wherein each of the one or more halocarbons has a boiling point in the range of 85° C. to 200° C.

5. The thermal management circuit of claim 1, wherein the one or more fluorocarbons are selected from fluoroalkanes and oxygenates thereof, fluoroalkenes and oxygenates thereof, fluoroaromatic compounds, and fluorinated ethers.

6. The thermal management circuit of claim 1, wherein each of the one or more halocarbons does not have a flash point of less than 180° C. measured in accordance with ASTM D93.

7. The thermal management circuit of claim 1, wherein each of the one or more halocarbons does not have a flash point measurable in accordance with ASTM D93.

8. The thermal management circuit of claim 1, wherein the one or more halocarbons are present in a total amount in the range of 0.5 wt % to 15 wt %.

9. The thermal management circuit of claim 1, wherein the total amount of the dielectric fluid and the one or more halocarbons in the thermal management fluid is at least 95%.

10. The thermal management circuit of claim 1, wherein the thermal management fluid does not have a flash point less than 180° C. measured in accordance with ASTM D93.

11. The thermal management circuit of claim 1, wherein the thermal management fluid has no measurable flash point in accordance with ASTM D93.

12. The thermal management circuit of claim 1, wherein the thermal management fluid does not have a flash point that is less than 10 degrees more than the flash point of the dielectric fluid.

13. The thermal management circuit to claim 1, wherein when absorbing thermal energy produced by the heat source, each of the one or more halocarbons does not reach its boiling point.

14. The thermal management circuit of claim 1, further comprising an immobilized desiccant material disposed in the fluid path, the desiccant material being configured to remove aqueous contaminants in the thermal management fluid that passes through the fluid path.

15. The thermal management circuit of claim 1, wherein the heat source is an electrical component.

16. The thermal management circuit of claim 15, wherein the electrical component is selected from a battery system, a capacitor, inverter, electrical cabling, a fuel cell, a motor, or a computer.

17. A method comprising:
providing a thermal management circuit of claim 1;
circulating the thermal management fluid in the fluid path; and
absorbing thermal energy by the heat source in the thermal management fluid.

* * * * *